(12) United States Patent
Fawcett et al.

(10) Patent No.: US 12,317,974 B2
(45) Date of Patent: Jun. 3, 2025

(54) METHOD OF MANUFACTURING A STRAP FOR A WEARABLE DEVICE

(71) Applicant: ARMOUR SURVEILLANCE SECURITY EQUIPMENT AND TECHNOLOGY LTD, London (GB)

(72) Inventors: Patrick James Fawcett, London (GB); Richard Dinan, London (GB)

(73) Assignee: ARMOUR SURVEILLANCE SECURITY EQUIPMENT AND TECHNOLOGY LTD, London (GB)

( * ) Notice: Subject to any disclaimer, the term of this patent is extended or adjusted under 35 U.S.C. 154(b) by 0 days.

(21) Appl. No.: 18/389,649

(22) Filed: Dec. 19, 2023

(65) Prior Publication Data
US 2024/0208118 A1  Jun. 27, 2024

(30) Foreign Application Priority Data

Dec. 22, 2022 (GB) .................................... 2219487
Feb. 28, 2023 (GB) .................................... 2302889

(51) Int. Cl.
*A44C 5/00* (2006.01)
*B29C 45/14* (2006.01)
(Continued)

(52) U.S. Cl.
CPC .......... *A44C 5/0053* (2013.01); *A44C 5/0007* (2013.01); *B29C 45/14065* (2013.01); *B29C 45/14508* (2013.01); *B29C 45/14754* (2013.01); *H04B 1/385* (2013.01); *A44C 5/147* (2013.01); *B29C 2045/0093* (2013.01); *B29C 45/1676* (2013.01); *B29K 2075/00* (2013.01);
(Continued)

(58) Field of Classification Search
None
See application file for complete search history.

(56) References Cited

U.S. PATENT DOCUMENTS 2,403,780 A * 7/1946 Barbieri .................. B29C 45/26
267/180
3,081,497 A  3/1963 Scherry
(Continued)

FOREIGN PATENT DOCUMENTS

CN  113974279 A  1/2022
DE  1806449 A1  6/1969
(Continued)

OTHER PUBLICATIONS

Rees, Herbert. "Mold engineering." Jun. 15, 2002, pp. 189-198. (Year: 2002).*
(Continued)

*Primary Examiner* — Benjamin A Schiffman
(74) *Attorney, Agent, or Firm* — Merchant & Gould P.C.

(57) ABSTRACT

A strap for a wearable device comprises a printed circuit board (PCB) located within said strap. The PCB comprises a first electronic component, coupled to a first flexible portion. The first electronic component is mounted to a cage, the cage comprising a cage pivot mount. The flexible portion is under tension and urges said first electronic component towards said cage pivot mount such that a pivotable connection is formed between said cage and said first electronic component. Also disclosed is a method of manufacture of the strap.

12 Claims, 7 Drawing Sheets

(51) Int. Cl.
*H04B 1/3827* (2015.01)
*A44C 5/14* (2006.01)
*B29C 45/00* (2006.01)
*B29C 45/16* (2006.01)
*B29K 75/00* (2006.01)
*B29L 31/00* (2006.01)
*H01Q 1/27* (2006.01)
*H04B 1/034* (2006.01)

(52) U.S. Cl.
CPC ... *B29K 2883/00* (2013.01); *B29L 2031/7276* (2013.01); *H01Q 1/273* (2013.01); *H04B 1/0343* (2013.01)

(56) References Cited

U.S. PATENT DOCUMENTS

| | | | |
|---|---|---|---|
| 3,109,201 | A | 11/1963 | Dulmage |
| 3,962,399 | A | 6/1976 | Shepherd, Jr. |
| 4,368,028 | A | 1/1983 | Grish |
| 4,470,786 | A | 9/1984 | Sano |
| 5,135,694 | A | 8/1992 | Akahane |
| 5,526,006 | A | 6/1996 | Akahane |
| 6,030,197 | A | 2/2000 | Takahashi |
| 6,401,307 | B1 | 6/2002 | Wild |
| 7,345,954 | B2 * | 3/2008 | Ehrsam .............. A44C 5/24 368/10 |
| 7,618,260 | B2 * | 11/2009 | Daniel .............. A44C 5/0007 439/528 |
| 8,102,735 | B2 * | 1/2012 | Morse .............. G04F 1/005 235/375 |
| 8,998,484 | B2 * | 4/2015 | Savoy .............. A44C 5/00 63/3 |
| 9,510,470 | B2 * | 11/2016 | Huitema .............. H05K 5/0017 |
| 9,848,494 | B2 * | 12/2017 | Huitema .............. H05K 1/0281 |
| 9,904,320 | B2 | 2/2018 | Justice |
| 9,939,787 | B2 * | 4/2018 | Baek .............. G04G 17/04 |
| 10,303,122 | B2 * | 5/2019 | Choi .............. G04C 10/00 |
| 11,077,589 | B2 | 8/2021 | Tanabe |
| 11,128,325 | B2 | 9/2021 | Dinan |
| 11,312,047 | B2 * | 4/2022 | Francois .............. A44C 5/0007 |
| 11,394,418 | B2 * | 7/2022 | Dinan .............. B60R 25/245 |
| 11,931,941 | B2 * | 3/2024 | Celant .............. B29C 45/14311 |
| 2006/0140055 | A1 | 6/2006 | Ehrsam |
| 2007/0279852 | A1 | 12/2007 | Daniel |
| 2009/0222130 | A1 | 9/2009 | Morse |
| 2013/0110264 | A1 | 5/2013 | Weast |
| 2015/0063075 | A1 | 3/2015 | Baek |
| 2015/0092360 | A1 * | 4/2015 | Stillman .............. H05K 1/181 361/749 |
| 2015/0346766 | A1 | 12/2015 | Justice |
| 2015/0378391 | A1 | 12/2015 | Huitema |
| 2016/0014919 | A1 | 1/2016 | Huitema et al. |
| 2017/0357214 | A1 | 12/2017 | Choi |
| 2018/0366962 | A1 * | 12/2018 | Dinan .............. H02J 50/10 |
| 2019/0036556 | A1 | 1/2019 | Dinan |
| 2019/0304265 | A1 | 10/2019 | Guercio |
| 2021/0036728 | A1 | 2/2021 | Dinan |
| 2022/0035317 | A1 | 2/2022 | Porter |
| 2023/0248124 | A1 * | 8/2023 | Fawcett .............. A44C 5/147 63/1.12 |
| 2024/0008600 | A1 * | 1/2024 | Lim .............. B29C 45/1418 |
| 2024/0206601 | A1 * | 6/2024 | Fawcett .............. H05K 7/1427 |
| 2024/0206606 | A1 * | 6/2024 | Fawcett .............. G04G 17/04 |
| 2024/0208117 | A1 * | 6/2024 | Fawcett .............. A44C 5/0053 |
| 2024/0208120 | A1 * | 6/2024 | Fawcett .............. G04G 21/04 |
| 2024/0210992 | A1 * | 6/2024 | Fawcett .............. G06F 1/1635 |
| 2024/0215171 | A1 * | 6/2024 | Fawcett .............. G04G 17/04 |

FOREIGN PATENT DOCUMENTS

| | | | |
|---|---|---|---|
| DE | 3302789 A1 | 8/1983 | |
| EP | 4393345 A1 * | 7/2024 | .............. A44C 5/00 |
| GB | 2616966 A | 9/2023 | |
| KR | 20160048696 A1 | 5/2016 | |
| KR | 1020160048696 A | 5/2016 | |
| KR | 1020160048696 A1 | 5/2016 | |
| WO | 2017/136383 A1 | 8/2017 | |

OTHER PUBLICATIONS

Tahir, Irfan. Development of a Silicone Mold Tool for Injection Molding Plastic Parts. MS thesis. University of Minnesota, May 2020. (Year: 2020).*
UK Examination Report received for UK Application No. GB2305015.6 on May 31, 2024, 5 pgs.
UK Examination Report received for UK Application No. GB2302301.3 on Jun. 3, 2024, 4 pgs.
Extended European Search Report received for EP Application No. 23215668.7 on May 22, 2024, 6 pgs.
Extended European Search Report received for EP Application No. 23215663.8 on May 22, 2024, 11 pgs.
Extended European Search Report received for EP Application No. 23215675.2 on May 22, 2024, 9 pgs.
Extended European Search Report received for EP Application No. 23215672.9 on May 22, 2024, 9 pgs.
Search Report under Section 17, issued in GB 2302889.7 (Aug. 9, 2023).
Search Report under Section 17, issued in GB 2302318.7 (Jul. 31, 2023).
Search Report under Section 17, issued in GB 2302890.5 (Aug. 11, 2023).
Combined Search and Examination Report under Section 17 and 18(3), issued in GB 2305015.6 (Aug. 29, 2023).
Combined Search and Examination Report under Section 17 and 18(3), issued in GB 2302301.3 (Jul. 31, 2023).
European Search Report received for EP Application No. 23215671.1 on Jul. 1, 2024, 11 pgs.

* cited by examiner

METHOD OF MANUFACTURING A STRAP FOR A WEARABLE DEVICE

TECHNICAL FIELD

The invention related to a strap for a wearable device comprising a printed circuit board (PCB) located within said strap.

BACKGROUND

Portable electronic devices, such as watches and straps with a radio transmitter, require a substantial number of components to be located into a relatively small volume, particularly if the resulting electronic device is to be small enough to be worn on the wrist for everyday use. There are many design limitations for such straps, such as requiring the use of radio transparent materials, being soft enough for comfort, being flexible enough to be accommodated on the wrist, whilst being sturdy enough to protect the delicate electronic components.

A common issue with such watches and straps is that the internal components can be seen deforming and protruding from the strap, such as when the strap is bent. This can cause discomfort for the user and ruin the aesthetic appeal of the strap, as well as destroying any environmental seal provided by the strap. Making the strap out of harder materials could overcome this issue but this necessarily makes the strap less comfortable and decreases flexibility.

A first aspect of the present invention relates to a strap for a wearable device comprising a printed circuit board (PCB) located within said strap, said PCB comprising a first electronic component, coupled to a first flexible portion; wherein said first electronic component is mounted to a cage, the cage comprising a cage pivot mount; wherein said flexible portion is under tension and urges said first electronic component towards said cage pivot mount such that a pivotable connection is formed between said cage and said first electronic component.

Providing the first electronic component with a cage provides a degree of protection to the device, however to provide protection the cage must be rigid. The present invention provides a strap which prevents damage to the PCB by protecting sensitive components with a cage, whilst allowing the wearable device to maintain its flexibility by allowing the electronic component to pivot with respect to the cage. The maximum angle of the pivotable connection can be optimised such that the cage begins to provide resistance to bending prior to damage occurring to the PCB. Additionally, due to constraints of the over moulding process, the strap is usually formed in a U-shape with the ends of the strap close to parallel, but in use, such as when attached to a watch housing, the ends of the strap will be facing each other, therefore both the strap and the PCB must be capable of flexing to avoid damage.

According to an example, said PCB further comprises a second electronic component attached to said flexible portion; wherein said second electronic component is mounted to said cage.

The cage can be attached to two electronic components, with the flexible portion of the PCB under tension urging the first component towards the cage and the second component towards the first component. In this way, a single small lightweight cage can provide protection for multiple components, as well as locating the components within the mould during manufacture.

According to an example, said second electronic component snap fits onto said cage.

By providing a snap fit, the second electronic component cannot be easily pulled away from the cage, allowing the flexible portion of the PCB to provide tension to keep the first electronic component in position.

According to an example, said cage pivot mount is substantially U-shaped.

According to an example, said PCB comprises a third electronic component, coupled to said second electronic component by a second flexible portion, said third electronic component mounted to a second cage.

According to an example, the first electronic component comprises a transmitter for transmitting radio signals.

According to an example, the first electronic component or the second electronic component is a battery.

According to an example, the battery is a coin cell.

According to an example, the strap comprises polyurethane.

According to an example, the strap comprises a button for operation of any of the electronic components.

According to an example, the strap connects to a watch housing.

According to an example, said cage and/or said second cage comprises a secondary mount for retaining a further electronic component.

A further aspect relates to a method of making a wearable device comprising: inserting the PCB, electronic components, flexible linkage and cage into a mould, attaching a tool to said cage such that said PCB is not in contact with said mould, injecting a liquid applied structural component into said mould.

In order to maintain a minimal thickness for the strap, it is required to use the minimal volume as efficiently as possible. By using the cage to ensure that the components are not in contact with the mould, the cage is used for multiple purposes, including providing flexibility, protecting the components and in manufacture of the wearable device.

According to an example, the cage comprises a hole for a fixing means and wherein said tool engages said hole for a fixing means.

A further aspect relates to a method of manufacturing a wearable device comprising: providing a mould for a strap, the strap comprising a first opening and a second opening; inserting a first component and a second component into said mould, wherein said first and second component are reciprocally pivotally mounted and at least temporarily fixed relative to each other by a fixing means, injecting a liquid applied structural component into said mould, removing said at least temporary fixing means such that the first and second components can pivot relative to each other.

By initially having the first component and second component fixed in position relative to each other, they can be positioned within the mould more easily. For example, if the first component is a socket for attaching to a watch housing and the second component is a button chassis which is to be located within and protruding from the strap, it would be difficult to locate these components within the mould if they were pivotally mounted. Conversely, if the components were rigidly affixed, then the flexibility of the strap would be diminished, potentially leading to damage or discomfort during use. The present invention mitigates these potentially negative outcomes by providing a rigid connection during manufacture which can convert to a pivotable connection after manufacture.

According to an example, said first component and/or said second component comprises a tool engagement portion, the method further comprising using a tool to locate the first and second components within the mould, such that said first component and said second component are not in contact with said mould.

According to an example, said tool comprises a first tool portion and a second tool portion, said first and second tool portions being releasably attached to each other, the method further comprising, releasing said first tool portion from said second tool portion.

According to an example, the first component is a socket for attaching to a watch housing, the socket protruding from the strap.

According to an example, said socket comprises at least one vent and during injection of said liquid applied structural component, said vent is in fluid communication with a device for reducing air pressure within said mould.

According to an example, the second component is a chassis and wherein the chassis comprises a button receiving portion.

According to an example, said button receiving portion comprises a button.

According to an example, the fixing means is a screw, such as but not exclusively a grub screw.

According to an example, the strap comprises polyurethane.

According to an example, the wearable device comprises at least one electronic component.

According to an example, said button operates said electronic component.

According to an example, said electronic component is a transmitter for transmitting radio signals.

According to an example, the mould comprises silicone.

A further aspect relates to a wearable device made according to the method described above.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
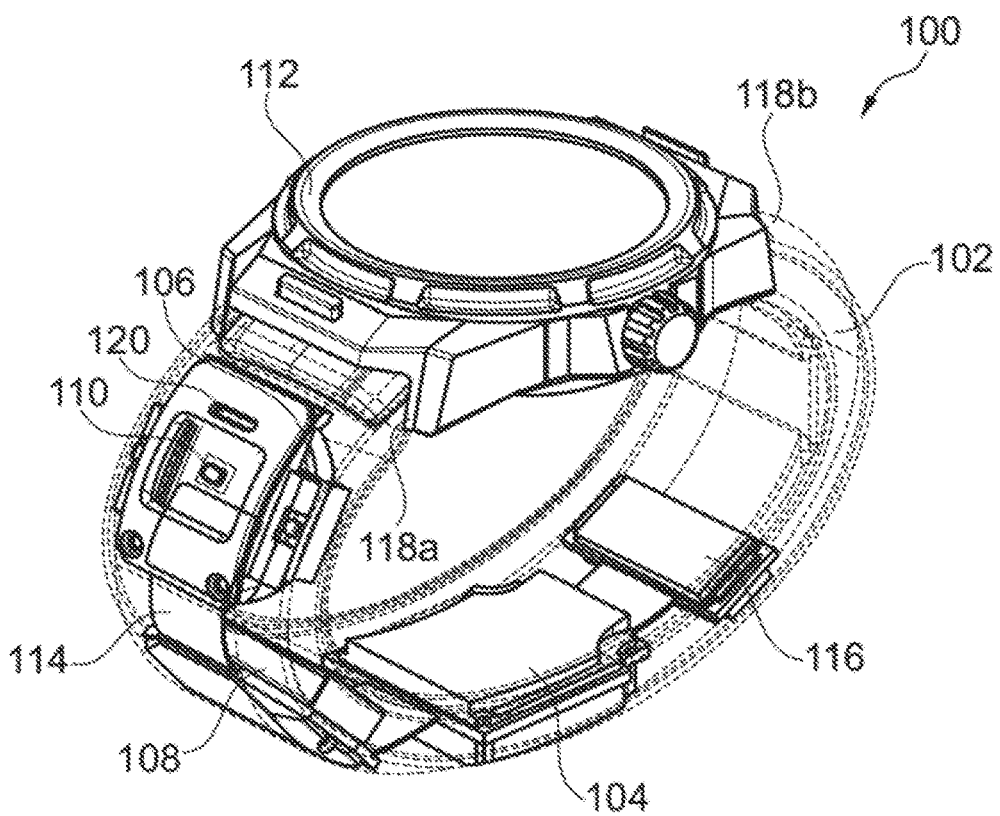
FIG. 1A illustrates an aspect of the subject matter in accordance with one embodiment.

Certain terminology is used in the following description for convenience only and is not limiting. The words 'right', 'left', 'lower', 'upper', 'front', 'rear', 'upward', 'down', 'downward', 'above' and 'below' designate directions in the drawings to which reference is made and are with respect to the described component when assembled and mounted (e.g. in situ). The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner.

Through the description and claims of this specification, the terms 'comprise' and 'contain', and variations thereof, are interpreted to mean 'including but not limited to', and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality, as well as, singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract or drawings), or to any novel one, or any novel combination, of the steps of any method or process so disclosed.

FIG. 1A shows the internal components of a strap 102 according to an embodiment of the present invention. The strap 102 is connectable to a watch housing 112 to provide the functionality of a conventional mechanical watch with apparatus for communicating with a remote security system. Although the present invention may have other applications, the invention will be described with particular reference to examples in which the security system is a remote security system of a vehicle, such as a keyless entry or a Keyless Go™ system. The strap may be a strap, or bracelet without a watch or watch housing 112.

The strap 102, includes two ends 118a, 118b, the ends are connected to opposite sides of an optional watch housing 112, which contains a mechanical watch movement. Here mechanical means a watch movement which derives its power from a coiled spring and/or one which derives regulation from an escapement mechanism, rather than, for example, a quartz movement, although other mechanisms may be used instead. The watch housing 112 is made of metal such that it is hard wearing and non-brittle. In some embodiments, the metal may be a precious metal such as gold or platinum. The components of the mechanical watch movement are also made from metal. However, metals, especially precious metals, are generally radio opaque, meaning that communicating with a vehicle via radio antenna within the wearable device housing is not possible, this issue is particularly pronounced when the watch movement is a mechanical watch movement which has all metal parts.

The strap 102 is at least partially flexible and the length variable/settable, such that the wearable device 100 may be worn by users having different sized wrists. In the illustrated embodiment, this is achieved by forming part of each strap from a flexible rubber material. However, the skilled person will understand that other flexible materials could be used in other embodiments.

The strap 102 in the embodiment shown comprises a PCB, including flexible portions 114 and electronic components. In the example shown, the electronic components include first and second batteries 106, 108, the batteries may be coin cells. The electronic components further include a transmitter for transmitting radio signals 104 and a button 110 for activating the electronic components. Each of the electronic components is provided with a cage which has a plurality of uses both during and after manufacture. The transmitter for transmitting radio signals 104 may be a transceiver for receiving and transmitting signals. The transmitter for transmitting radio signals 104 is connected to an antenna 116. Each of the transmitter 104 and the antenna 116 may be configured to either transmit, receive or both transmit and receive signals, such as radio signals. The transmitter and antenna may be configured to receive and transmit signals of different frequencies.

The present invention allows the transmission of signals from the transmitter 104 because the strap 102 is formed from radio transparent materials. For example, the straps may be formed of rubber or polyurethane, and optionally coated with leather or another radio-transparent material.

The transmitter is arranged to transmit radio signals which communicate with a vehicle, allowing a user to passively unlock the vehicle when the watch is within a predetermined range, or actively lock and unlock the vehicle using the button 110. This may be referred to as a keyless entry system. Keyless entry systems typically work by the vehicle intermittently transmitting signals, which are received by a transceiver of the keyless entry system. Upon receipt of the signal from the vehicle, the transceiver produces a signal comprising a code which can be received by the vehicle. If a signal indicating a "correct" code is received by the vehicle, then the doors are automatically unlocked, with no further action from the user being required.

The wearable device 100 is provided with a button 110 attached to the strap 102, which button may be operable to cause a signal to be sent, which signal may cause a vehicle to start if it is sent from within the vehicle. However, it will be understood that the functionality available by pressing the button 110 will depend on the specific vehicle that the wearable device 100 is arranged to unlock and start. In some examples, the button may cause a signal to be sent that operates to unlock the vehicle from a relatively large distance away, in the manner of a conventional remote key.

A particular challenge associated with provision of Keyless Go™ and keyless entry functionality is that a relatively large amount of energy and a relatively high peak current is required to run the array of transceivers for these functions. Further, a large amount of energy will also need to be stored for the keyless entry functionality, because for some keyless entry systems the respective transceiver may need to be transmitting constantly (albeit at a very low power level). The present inventors have recognised that the peak current required by a keyless entry circuit may be in the region of 10 mA for some keyless entry systems. Accordingly, it is necessary to provide a cell that is able to provide this peak current and store an amount of energy that allows the wearable device to function for a required length of time before the battery needs to be replaced. It is also important for the cell to be relatively compact, as package space within the wearable device is limited. A suitable cell/battery may be a CR2032 coin cell.

Placing the batteries under the watch housing 112 may make the watch uncomfortably tall for the user. Therefore, the cells 106, 108 are placed in the strap 102. Placing the cells 106, 108 and the transceiver in the strap 102 ensures that the functionality of the strap and watch is maximised, without degrading the comfort and quality of the watch. Due to the volume required within the strap to house and pot each of the electronic components, it is not feasible to include a clasp, which would disengage the components, making it necessary to allow the strap to flex such that it can be removed from the user without damaging the internal components.

Figure 1B:
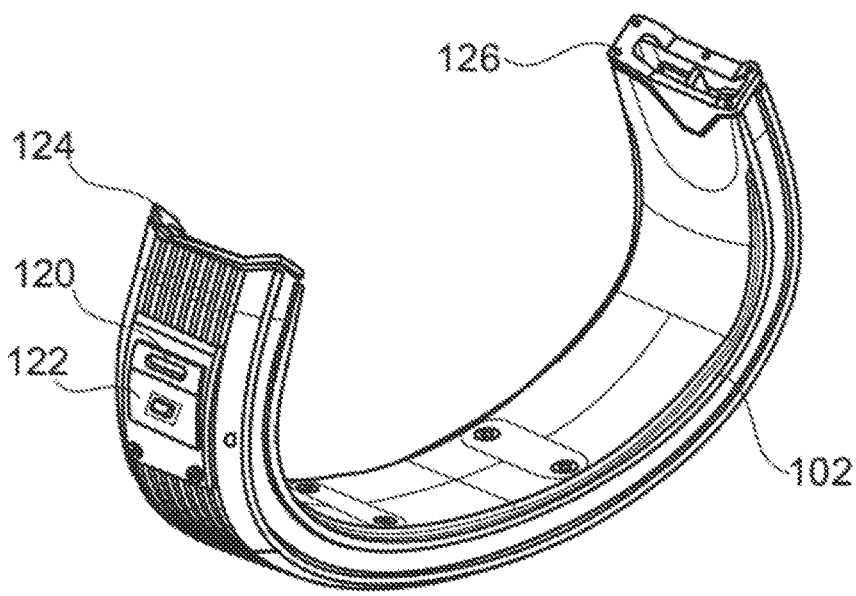
FIG. 1B illustrates an aspect of the subject matter in accordance with one embodiment.

FIG. 1B shows a perspective view of the strap 102 with the button 122. The outer portion of the button 122 and LED indicator 120 and first and second sockets 124, 126 are visible from the exterior of the strap, but the other components are hidden within the strap. The watch housing which connects to the two ends of the strap 102 is not shown, in some examples, the ends of the strap or the sockets 124, 126, may connect to each other or to a clasp or buckle. In the example shown, the button 122 sits atop one of the battery cells (not shown). The button chassis includes an indicator light, in the form of an LED indicator 120. The battery cell is connected to a second battery which may be attached to a cage (not shown) which is connected to the transmitter for transmitting radio signals (see FIG. 1A 104). The second battery is connected to the transmitter for transmitting radio signals (see FIG. 1A 104) via the flexible PCB, and the transmitter is connected to the antenna (see FIG. 1A 116) via the flexible PCB. In varying examples of the present invention, the electronic components can be arranged in any suitable order.

Figure 2A:
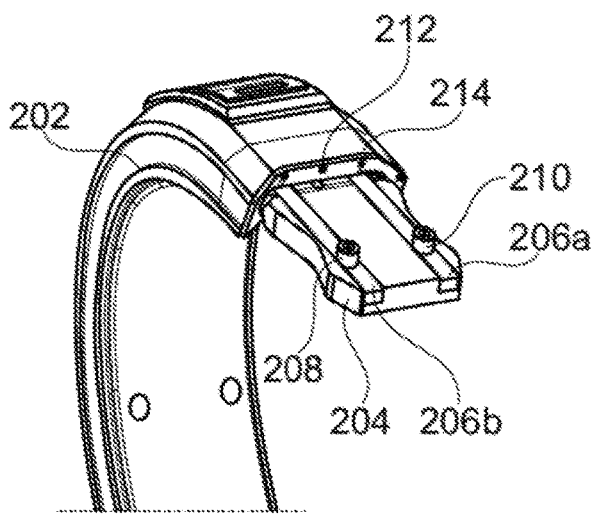
FIGS. 2A-2E illustrate an aspect of the subject matter in accordance with one embodiment.

FIG. 2A shows a tool inserted into the strap 202 which may be used to arrest components within the mould prior to the injection of polyurethane. Additionally, the tool fills a portion of the mould which must not be filled with the liquid applied structural component/polyurethane. This portion is the interior of a socket which is used to connect the watch housing to the strap.

The tool comprises a first tool portion 204 which is releasably attached to second tool portions 206a, 206b by first tool screw 208 and second tool screw 210. The second tool portions 206a, 206b engage the interior of the socket, filling the void within and preventing the intrusion of injected polyurethane. The socket 214 may include vent holes 212, which coincide with vents within the mould and attach to a vacuum generator (not shown). The vent holes 212 extend through the socket 214 and into the void within the mould such that the air pressure within the mould can be reduced to encourage the liquid applied structural component to fill the whole volume of the mould. Fibres of polyurethane may fill the vents and remain attached to the strap 202 after manufacture, these fibres can be removed with no visible trace.

Figure 2B:
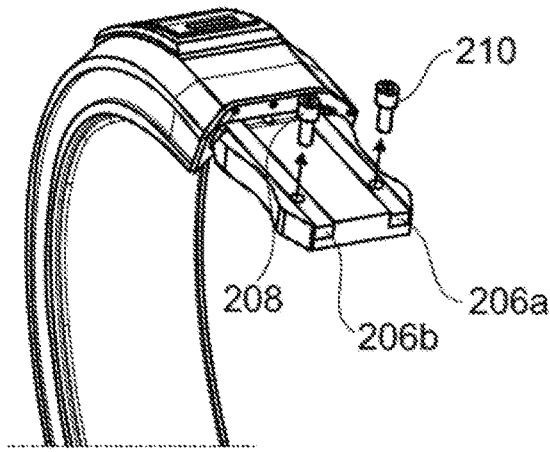
Figure 2C:
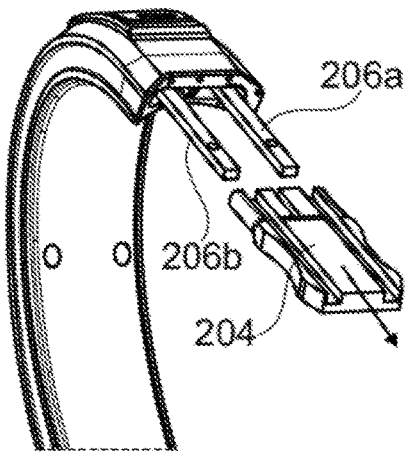

When the polyurethane has cured and the mould has been removed, the tool may be partially encased in cured polyurethane, meaning that it is difficult to remove without cutting the strap. To make removal of the tool simple, it can be taken apart by removing the first and second tool screws 208, 210 as shown in FIG. 2B. The first tool portion 204 can be decoupled from the second tool portions 206a, 206b and slidingly removed from the strap 202 as shown in FIG. 2C.

Figure 2D:
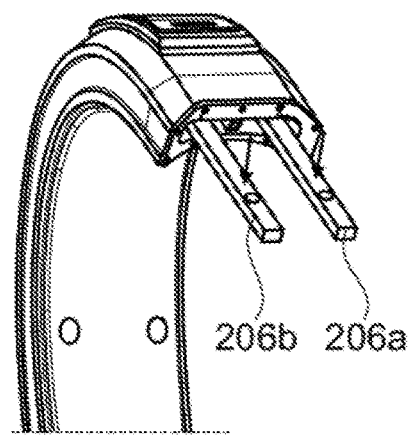
Figure 2E:
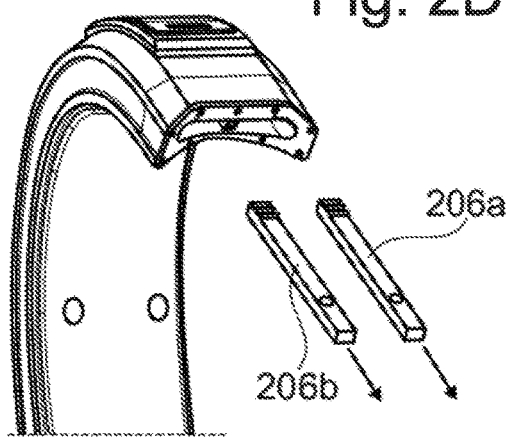

The second tool portions 206a, 206b can then be detached from the socket 214 by applying a detaching force as shown in FIG. 2D and subsequently removed from the strap 202 as shown in FIG. 2E.

Figure 3:
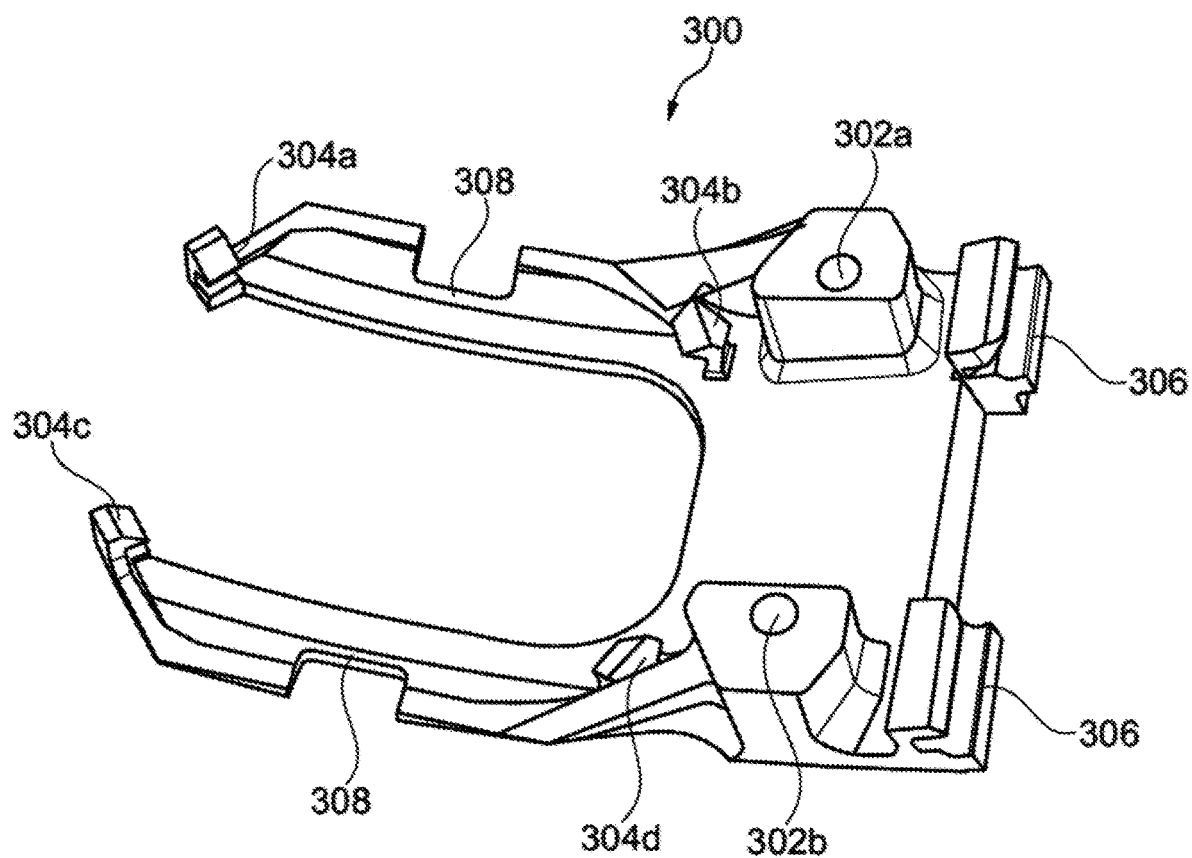
FIG. 3 illustrates an aspect of the subject matter in accordance with one embodiment.

FIG. 3 shows a first cage, the cage includes an extension area 308 for accepting an electronic component (not shown), the electronic component snap fits onto snap fit receivers 304a-d such that it cannot move relative to the cage.

The cage includes holes for a fixing means 302a-b which are used to hold the cage in place during manufacture and subsequently to affix plates.

The cage includes cage pivot mount 306 which a further electronic component is mounted to, the further electronic component is held in position by a flexible portion of PCB (not shown) which provides electronic communication between the electronic component and the further electronic component (not shown).

Figure 4:
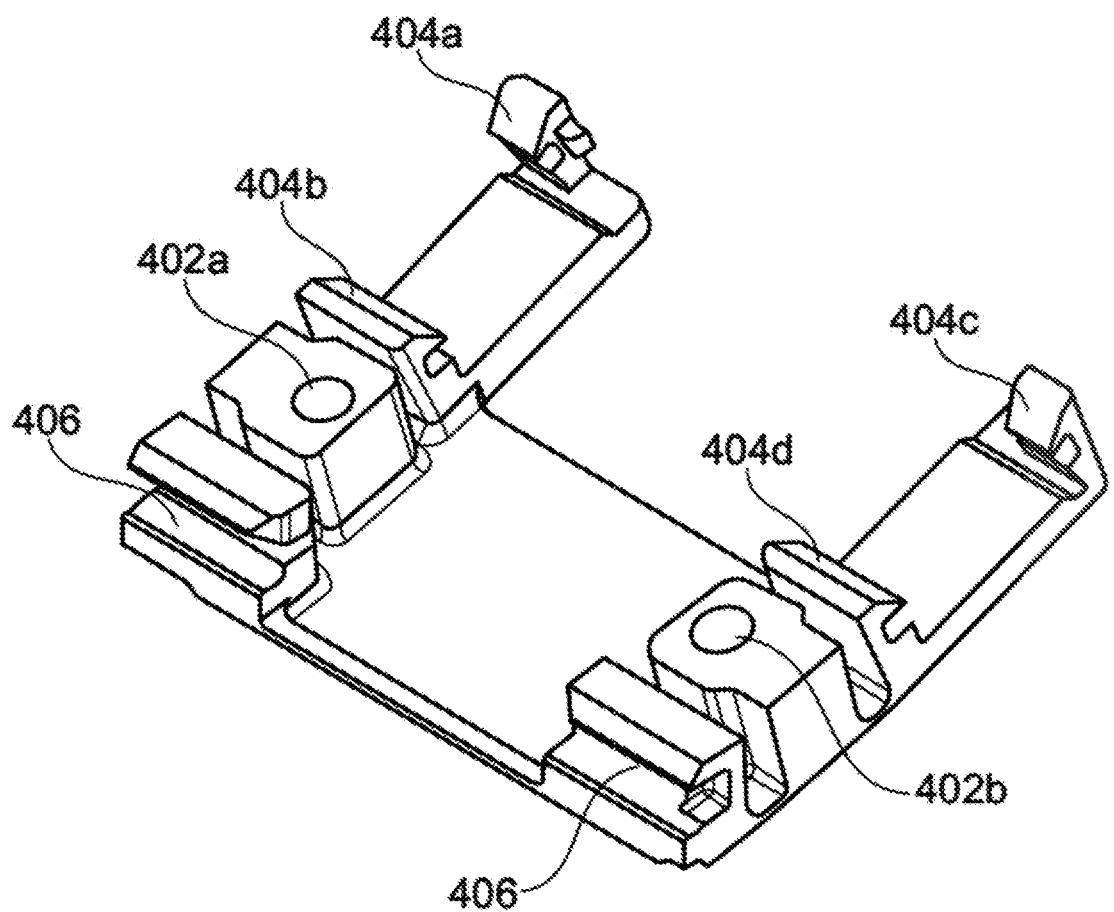
FIG. 4 illustrates an aspect of the subject matter in accordance with one embodiment.

FIG. 4 shows a second cage, the second cage includes a portion for receiving an electronic component, the electronic component snap fits onto snap fit receivers 404a-d such that it cannot move relative to the cage.

The cage includes holes for a fixing means 402a-b which are used to hold the cage in place during manufacture and subsequently to affix plates.

The cage includes a cage pivot mount 406 which a further electronic component is mounted to, the further electronic component is held in position by a flexible portion of PCB (not shown) which provides electronic communication between the electronic component and the further electronic component (not shown).

In some examples, cage pivot mount 306 and cage pivot mount 406 work in conjunction to hold a single electronic component in position, such as the transceiver/transmitter for transmitting radio signals.

Figure 5:
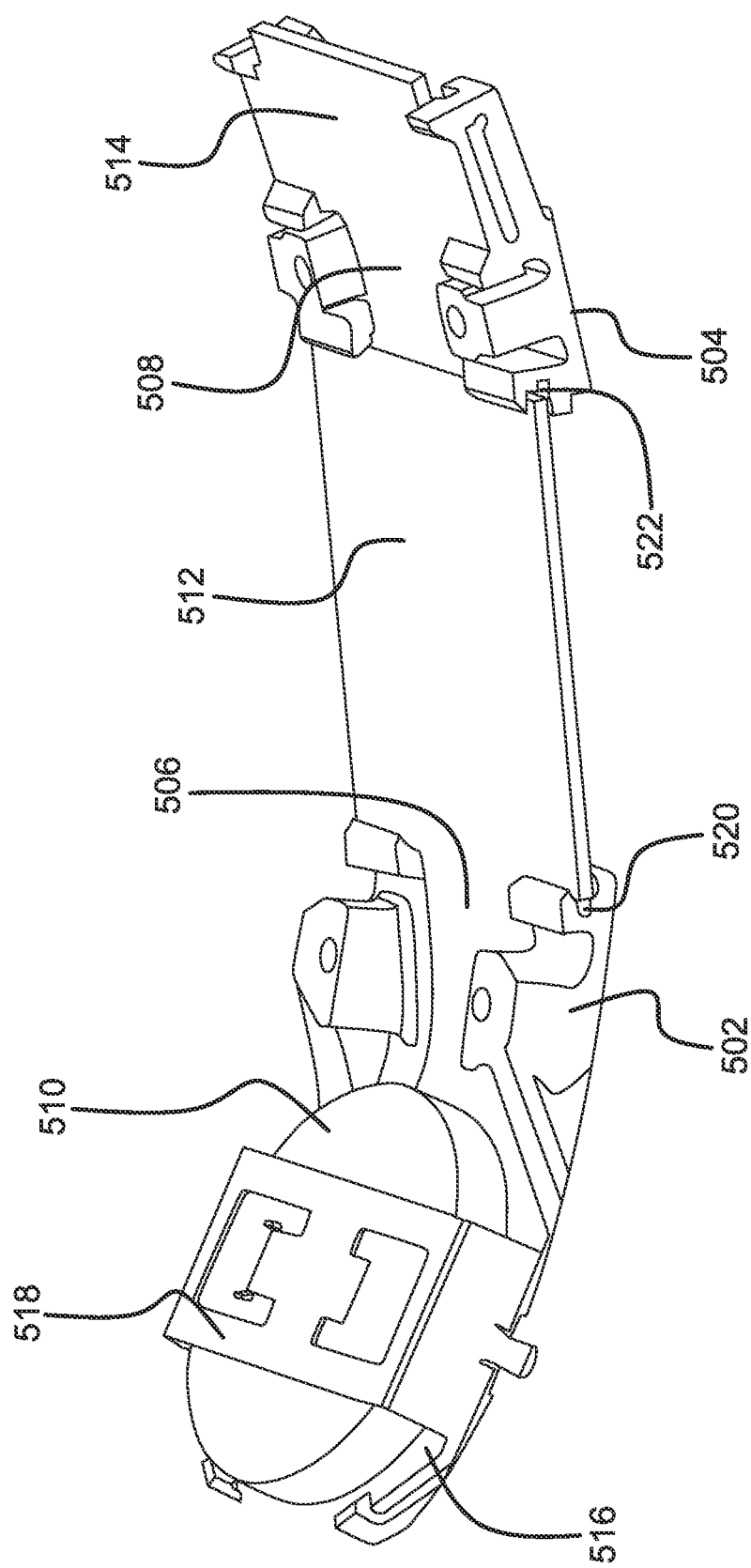
FIG. 5 illustrates an aspect of the subject matter in accordance with one embodiment.

FIG. 5 shows how the first, second and third electronic components and cages are mounted relative to each other prior to entering the mould. The first electronic component 510, which in the example shown is a coin cell, is mounted to a rigid portion 516 of the PCB which in turn is mounted to the first cage 502 by the snap fit receivers. The first electronic component 510 is held in position by a barrier 518 connected to the first cage 502. The first electronic component 510 is attached to the second electronic component 512 via flexible portion 506. The flexible portion 506 is under tension which urges the first and second electronic components 510 and 512 towards each other, the first electronic component 510 is arrested relative to the first cage 502. As such, the second electronic component 512 is urged toward the U-shaped cage pivot mount 520. The second electronic component 512 is further attached to the third electronic component 514 by second flexible portion 508 which is also under tension, causing the second electronic component 512 to be urged towards second cage 504 and second cage pivot mount 522.

Figure 6:
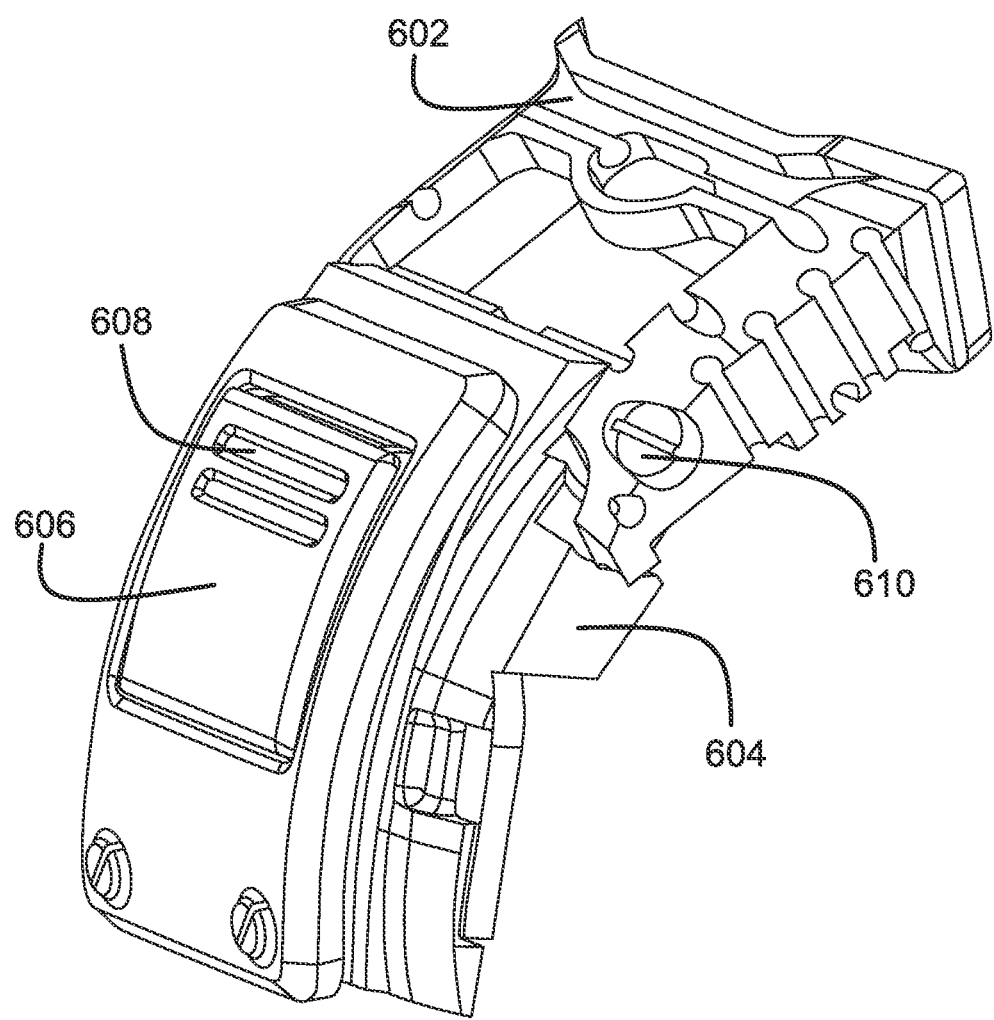
FIG. 6 illustrates an aspect of the subject matter in accordance with one embodiment.

FIG. 6 shows how the socket 602 and button chassis 604 are pivotally mounted with respect to each other. The socket 602 is attached to the chassis using a screw 610 as shown in the figure, although any other appropriate means could be used, such as a rivet or dowel which allows the angle of the button chassis to change with respect to the socket, providing the required flexibility for the strap. A benefit of this flexible connection between these two components within the strap is that the socket can be connected directly to a watch movement, without the need to include further flexibility.

This means that the connection can be simplified or include additional features, such as variable length, or an openable joint for removal of the wearable device. The button chassis includes a depressible button, which may have various functions, such as locking and unlocking a door for a vehicle or otherwise, engine ignition, horn or light activation for a vehicle or any other use which is usually associated with a key fob for a vehicle. The button chassis includes an LED indicator 608, which may be used to indicate various information, such as the distances from the associated vehicle, low battery warnings, lock information about the vehicle, connectivity information, etc.

Figure 7:
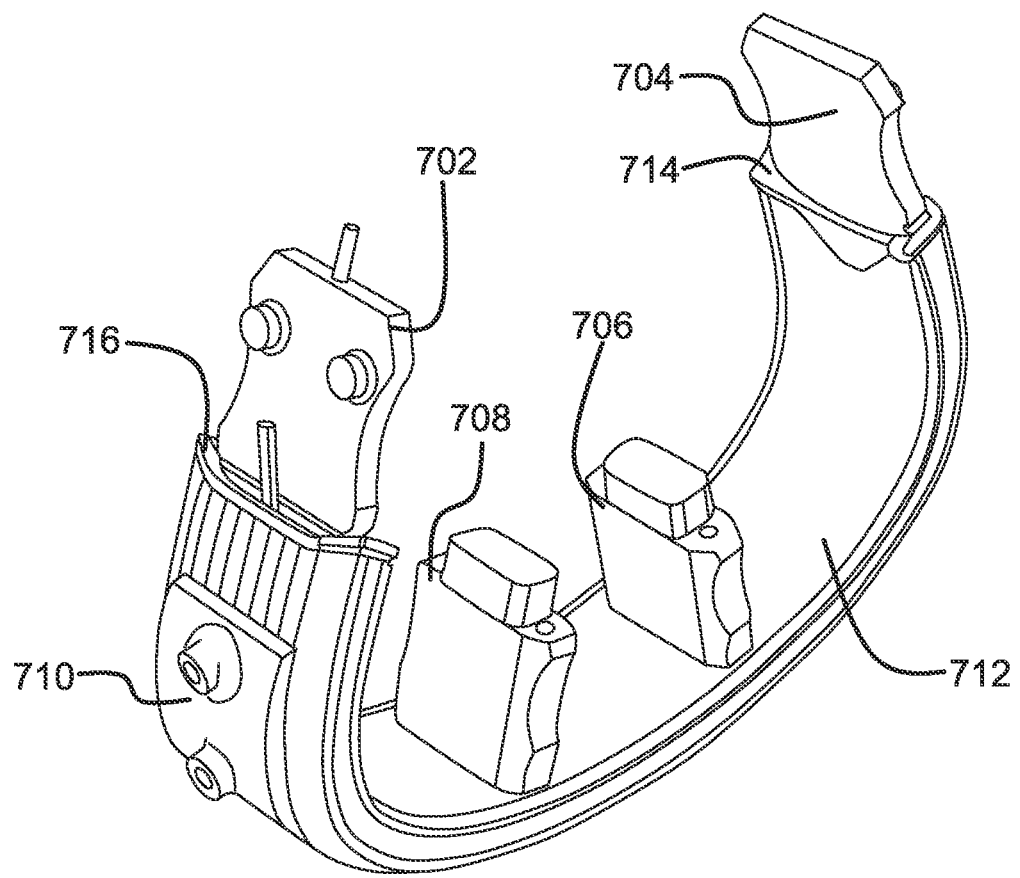
FIG. 7 illustrates an aspect of the subject matter in accordance with one embodiment.

FIG. 7 illustrates the void created with the mould. The mould may be generated by 3D printing a unitary master pattern component, positioning the master within a fabrication box and subsequently filling the fabrication box with liquid silicone rubber. When the silicone rubber has hardened, the silicone is cut into two halves and the master removed, such that when the two halves are placed together a void as shown is left in the form of the required shape for the component. Subsequently, flow channels can be cut into the mould to provide channels through which liquid polyurethane can flow. When the two halves of the mould are connected a substantially air tight mould is formed. Vents can be added as required which connect at specific points on the void which provide a fluid connection to a vacuum generator. After injection and curing of the liquid applied structural component, the vents will be filled with solid structural component. This leads to blemishes in the resulting strap which may be considered unsightly. Therefore, it is preferable to locate the vents strategically to coincide with additional components such as the button which will cover the blemishes. Alternatively, or additionally, the vents may coincide with an edge of the resulting strap and the edge and resulting blemishes removed with a scalpel or similar implement. The PCB and cage(s) are positioned within the void and a tool or tools are attached to the cage(s). The tool (or tools) is used to create a small distance on the order of 1 mm between the interior of the mould and the cages and PCB. This is achieved by connecting the tool and cages using bolts which can be finely manipulated to achieve the required distance between the PCB and the mould.

Located at the ends of the strap void 712 are two tool voids 702, 704 for tools of the type shown in FIG. 2. In the version shown, voids for sockets 714, 716 are also located at the ends of the strap, with the voids for tools 702, 704 and sockets 714, 716 intersecting each other. A void for a button chassis locator tool 710 is also included, the button chassis locator tool is used to hold the button chassis in position during the injection of liquid applied structural component. The angle between the button chassis and the socket must be fine tuned prior to injection of the liquid applied structural component to ensure that there is sufficient clearance between the components and the mould. If any portion of any component of the strap is too close to the mould, the presence of the component will be visually apparent, potentially spoiling the aesthetics of the strap.

The void includes a strap void 712, and additional voids 706, 708 for insert tools to arrest the cages within the mould during injection of the liquid applied structural component and to provide a channel for the injection of said liquid applied structural component.

The invention claimed is:

1. A method of manufacturing a strap comprising:
   providing a mold for said strap, the strap comprising a first opening and a second opening;
   inserting a socket (602) for attaching to a watch housing, and a chassis into said mold such that the socket is protruding from the strap, wherein the socket and the chassis are reciprocally pivotally mounted and at least temporarily fixed relative to each other by an at least temporary fixing means,
   injecting a liquid applied structural component into said mold,
   removing said fixing means such that the socket and the chassis can pivot relative to each other.

2. The method of claim 1 wherein the socket and/or the chassis comprises a tool engagement portion, the method further comprising using a tool to locate the socket and the chassis within the mold, such that the socket and the chassis are not in contact with said mold.

3. The method of claim 2 wherein said tool comprises a first tool portion and a second tool portion, said first and second tool portions being releasably attached to each other, the method further comprising, releasing said first tool portion from said second tool portion.

4. The method of claim 1 wherein said socket comprises at least one vent and during injection of said liquid applied structural component, said vent is in fluid communication with a device for reducing air pressure within said mold.

5. The method of claim 1 wherein the chassis comprises a button receiving portion.

6. The method of claim 5 wherein said button receiving portion comprises a button.

7. The method of claim 1 wherein the fixing means is a screw.

8. The method of claim 1 wherein the strap comprises polyurethane.

9. The method of claim 1 wherein the wearable device comprises at least one electronic component.

10. The method of claim 9 wherein a button operates said electronic component.

11. The method of claim 9 wherein said electronic component is a transmitter for transmitting radio signals.

12. The method of claim 1 wherein the mold comprises silicone.

* * * * *